United States Patent Office 3,579,534
Patented May 18, 1971

3,579,534
TETRAHYDROCARBAZOLECARBOXYLATES
Ruddy Littell, Rivervale, and George Rodger Allen, Jr.,
Old Tappan, N.J., assignors to American Cyanamid
Company, Stamford, Conn.
No Drawing. Filed May 9, 1969, Ser. No. 823,471
Int. Cl. C07d 27/68
U.S. Cl. 260—315                                            6 Claims

ABSTRACT OF THE DISCLOSURE

Preparation of substituted tetrahydrocarbazolecarboxylic derivatives, are described. They are useful for their central nervous system activity, as anticonvulsants.

SUMMARY OF THE INVENTION

This invention relates to novel tetrahydrocarbazolecarboxylic derivatives of the formula:

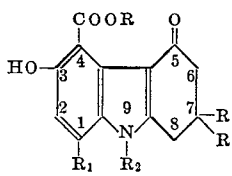

wherein R is a member selected from the group consisting of hydrogen and lower alkyl, $R_1$ is a member selected from the group consisting of hydrogen and chlorine, and $R_2$ is a member selected from the group consisting of hydrogen, lower alkyl, phenyl, and phenyl loweralkyl.

The compounds of the present invention are, in general, crystalline solids which are insoluble in water, but moderately soluble in organic solvents such as acetone, methanol, ethanol, propanol, dimethylformamide and the like.

The compounds of the present invention are preferably prepared by methods illustrated in the following flowsheet:

FLOWSHEET

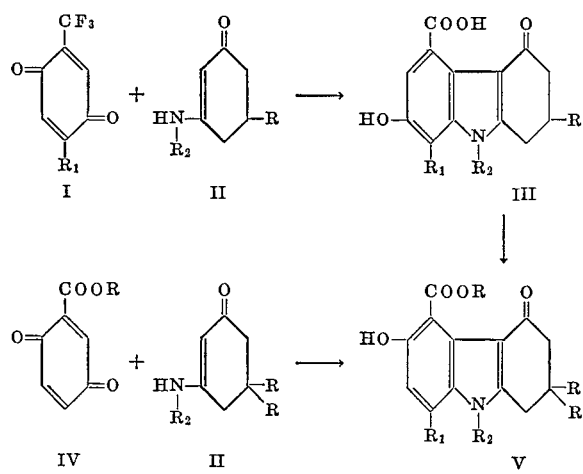

wherein R, $R_1$ and $R_2$ are as described hereinbefore. In accordance with the above flowsheet treatment of a 2-trifluoromethyl-1,4-benzoquinone (I), optionally substituted in the para-position with a chlorine atom, with a 3-amino-2-cyclohexen-1-one or a 3-substituted amino-2-cyclohexen-1-one produces the novel tetrahydrocarbadolecarboxylate derivatives (III) of the present invention. This reaction is preferably carried out using a lower alkanoic acid solvent; acetic acid being particularly useful in this regard. The reaction is best performed at the boiling point of the solvent. Using the method of Fischer esterification of the tetrahydrocarbazolecarboxylic acid (III); prepared with an alkanol in the presence of a mineral acid catalyst gives the alkyl tetrahydrocarbazolecarboxylates (V) of the present invention. Alternatively, (V) may be prepared by the reaction of a 2-alkoxycarbonyl-1,4-benzoquinone (IV) with a 3-amino-2-cyclohexen-1-one or a 3-substituted amino-2-cyclohexen-1-one (II); the preparation of (V) by this method is accomplished using a lower alkanol as the solvent and is preferably performed at temperatures of 65°–100° C.

A number of the compounds of the present invention may also be prepared from 4a,7,8,9a-tetrahydro-9a-hydroxy-4-trifluoromethylcarbazole-3,5-(4H,6H)-diones as described in the examples hereinafter and as illustrated in the following flowsheet:

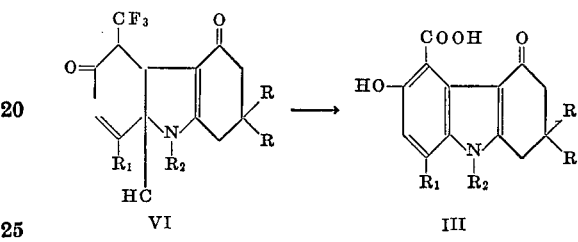

wherein R, $R_1$ and $R_2$ are as defined hereinbefore. In accordance with this reaction treatment of a 4a,7,8,9a-tetrahydro - 9a - hydroxy - 4-trifluoromethylcarbazole-3,5-4H, 6H)-dione (VI) with an oxidant in a lower alkanoic acid solvent gives the novel compounds of the present invention. The reaction is preferably performed at the boiling point of the lower alkanoic solvent and is usually complete within 4–16 hours. The trifluoromethylbenzoquinones (I) are particularly advantageous oxidizing agents for performing this conversion.

The trifluoromethylbenzoquinones (I) and many of the 3-amino-2-cyclohexen-1-ones and 3-substituted amino-2-cyclohexen-1-ones (II) which serve as the starting materials for the novel compounds of the present invention are known compounds; those which are unknown may be prepared by procedures well known in the art.

The compounds of the present invention are physiologically active on the central nervous system, being active as anti-convulsants. The anti-convulsant properties of the novel compounds are shown by their ability to protect against strychnine-induced convulsions as assessed from their action in antagonizing the lethal effects of strychnine in mice.

The test procedure is a modification of the procedure described by H. M. Hanson and C. A. Stone in "Animal and Clinical Pharmacological Techniques in Drug Evaluation," vol. I, J. H. Nodine and P. E. Seigler, ed., Yearbook Medical Publishers, Inc., Chicago, Ill., 1964. In this procedure graded doses of the present compounds to be tested are administered to groups of mice, and this is followed by administering a dose of strychnine. Control groups of mice are not given the test compound. The anti-convulsant treated groups (i.e., groups given the test compound) survive the lethal effects of the strychnine for an extended period, while the control groups, and groups treated with an ineffective anticonvulsant agent, normally die within 10 minutes of the strychnine administration.

The results obtained from several dose levels are used to establish effective dose ranges. The compounds of this invention show their anticonvulsant properties by this procedure at dose levels which produce little or no untoward reactions, as for example, ataxia or reduced spontaneous motor activity. Moreover, inasmuch as effectiveness in this test procedure may be an indication of anti-anxiety activity [M. I. Gluckman, Current Therapeutic Research, 7, 721 (1965)], the novel compounds of the present invention may also be used as minor tranquilizers.

SPECIFIC DISCLOSURE

The following examples described in greater detail the preparation of the compounds of the present invention.

EXAMPLE 1

Preparation of 5,6,7,8-tetrahydro-3-hydroxy-7,7-dimethyl-5-keto-4-carbazolecarboxylic acid A solution of 2.20 g. (12.5 mmoles) of 2-trifluoromethyl-1,4-benzoquinone and 1.40 g. (10 mmoles) of 3-amino-5,5-dimethyl - 2 - cyclohexen-1-one in 13 ml. of acetic acid is heated at reflux temperature for approximately 16 hours. The solution is cooled and filtered to give 670 mg. of crystals, melting point 262–264° C. (dec.). Crystallization from dimethylformamide-propyl alcohol gives crystals, melting point 266°–268° C., dec.

EXAMPLE 2

Preparation of 5,6,7,8-tetrahydro-3-hydroxy-5-keto-4-carbazolecarboxylic acid

A solution of 1.16 g. (6.6 mmoles) of 2-trifluoromethyl-1,4-benzoquinone and 666 mg. (6.0 mmoles) of 3-amino-2-cyclohexen-1-one in 10 ml. of acetic acid is heated at reflux temperature for 4 hours. The solution is cooled and filtered to give crystals, melting point 324–326° C., dec. Crystallization from propanol fails to alter the melting point.

EXAMPLE 3

Preparation of methyl 5,6,7,8-tetrahydro-3-hydroxy-7,7-dimethyl-5-keto-4-carbazolecarboxylate A stream of hydrogen chloride is introduced into a suspension of 600 mg. of 5,6,7,8-tetrahydro-3-hydroxy-7,7-dimethyl-5-keto-4-carbazolecarboxylic acid (Example 1) in 50 ml. of methanol for 3 minutes. The resulting clear solution is heated at reflux temperature for about 16 hours. The solvent is removed under reduced pressure, and the residue is dissolved in ethyl acetate. This solution is washed with sodium bicarbonate solution, dried over magnesium sulfate and evaporated to give white crystals. Crystallization from acetone-hexane gives white crystals, melting point 171°–174° C.

EXAMPLE 4

Preparation of methyl 5,6,7,8-tetrahydro-3-hydroxy-7,7-dimethyl-5-keto-4-carbazolecarboxylate A solution of 2.17 g. (13 mmoles) of 2-carbomethoxy-1,4-benzoquinone and 1.68 g. (12 mmoles) of 3-amino-5,5-dimethyl-2-cyclohexen-1-one in 20 ml. of ethanol is heated at reflux temperature for 4 hours. The solution is cooled to give 1.58 g. of 3,4-dihydro-7,10-dihydroxy-3,3-dimethyl-1,6(2H)phenanthridinedione as orange crystals. Crystallization from methanol gives orange needles, melting point 310°–312° C. (dec.).

The filtrate is evaporated, and the residue is subjected to partition chromatography on diatomaceous silica using a heptane-ethyl acetate-methanol-water (55:45:15:6) system. The initial product fraction is evaporated to afford an additional 400 mg. of the above phenanthridinedione, melting point 305°–307° C. (dec.).

The second product fraction is evaporated to give 1.0 g. of methyl 5,6,7,8-tetrahydro-3-hydroxy-7,7-dimethyl-5-keto-4-carbazolecarboxylate as crystals, melting point 168°–172° C.

EXAMPLE 5

Preparation of 5,6,7,8-tetrahydro-3-hydroxy-7,7-dimethyl-5-keto-4-carbazolecarboxylic acid A solution of 2.00 g. (12 mmoles) of 2-trifluoromethyl-1,4-benzoquinone and 1.4 g. (10.0 mmoles) of 3-amino-5,5-dimethyl-2-cyclohexen-1-one in 10 ml. of glacial acetic acid is allowed to warm by the reaction exotherm. Crystals appear, and after one-half hour the mixture is cooled and filtered. The solid is washed with ether to give 1.10 g. of 4a,7,8,9a-tetrahydro-9a-hydroxy-7,7-dimethyl - 4 - trifluoromethylcarbazole-3,5-(4H,6H)-dione as white crystals. Crystallization from methanol gives crystals, melting point 237°–240° C., (dec.).

A mixture of 500 mg. of 4a,7,8,9a-tetrahydro-9a-hydroxy-7,7-dimethyl - 4 - trifluoromethylcarbazole-3,5(4H,6H)-dione, prepared as described above, and 50 mg. of 2-trifluoromethyl-1,4-benzoquinone in 10 ml. of acetic acid is heated at reflux temperature for about 16 hours. The resulting solution is cooled and filtered to give 5,6,7,8-tetrahydro - 3 - hydroxy-7,7-dimethyl-5-keto-4-carbazolecarboxylic acid as crystals, melting point 260°–262° C., (dec.).

EXAMPLE 6

Preparation of 5,6,7,8-tetrahydro-3-hydroxy-5-keto-4-carbazolecarboxylic acid

A solution of 600 mg. (3.4 mmoles) of 2-trifluoromethyl-1,4-benzoquinone and 380 mg. (3.4 mmoles) of 3-amino-2-cyclohexene-1-one in 5 ml. of ethanol is heated at reflux temperature for one hour. Benzene (5 ml.) is added, and the solution is cooled and filtered to give 500 mg. of 4a,7,8,9a-tetrahydro-9a-hydroxy - 4 - trifluoromethylcarbazole-3,5(4H,6H)-dione as a tan powder. Recrystallization from methanol and then from ethanol gives white crystals, melting point 215° C., dec.

A mixture of 2.8 g. of 4a,7,8,9a-tetrahydro-9a-hydroxy-4-trifluoromethylcarbazole-3,5(4H,6H)-dione, prepared as described above, and 300 mg. of 2-trifluoromethyl-1,4-benzoquinone in 20 ml. of acetic acid is heated at reflux temperature for 4 hours. The resulting solution is cooled and filtered to give 5,6,7,8-tetrahydro-3-hydroxy-5-keto-4-carbazolecarboxylic acid, which has melting point 324°–326° C. (dec.), after recrystallization from propanol.

EXAMPLE 7

Preparation of 1-chloro-5,6,7,8-tetrahydro-3-hydroxy-5-keto-7,7-dimethyl-4-carbazolecarboxylic acid A solution of 421 mg. (2.0 mmoles) of 2-chloro-5-trifluoromethyl-1,4-benzoquinone and 278 mg. (2.0 mmoles) of 3-amino-5,5-dimethyl-2-cyclohexen-1-one in 5 ml. of glacial acetic acid is allowed to stand at ambient temperature for one-half hour. The solution is cooled in ice, and the solid that separates is collected by filtration, washed with benzene and dried to give 1-chloro-4a-7,8,9a-tetrahydro - 9a - hydroxy-7,7-dimethyl-4-trifluoromethylcarbazole-3,5(4H,6H)-dione as crystals, melting point 250°–251° C., dec.

When a mixture of 1-chloro-4a,7,8,9a-tetrahydro-9a-hydroxy - 7,7 - dimethyl - 4 - trifluoromethylcarbazole-3,5(4H,6H)-dione, prepared as described above, and 2-chloro-5-trifluoromethyl-1,4-benzoquinone in acetic acid is treated by the procedure of Example 5, 1-chloro-5,6,7,8-tetrahydro-3-hydroxy - 5 - keto - 7,7 - dimethyl-4-carbazolecarboxylic acid results.

EXAMPLE 8

Preparation of 5,6,7,8-tearahydro-3-hydroxy-5-keto-9-methyl-4-carbazolecarboxylic acid A stream of methlamine is introduced into a solution of cyclohexane-1,3-dione in toluene while the solution is heated at reflux temperature. The reaction is followed by withdrawal of aliquots at appropriate intervals and examination by thin layer chromatography. When the reaction is complete, as judged by this criterion, the hot solution is cooled to give 3-methylamino-2-cyclohexohexen-1-one.

When the procedure of Example 1 is followed, a mixture of 2-trifluoromethyl-1,4-benzoquinone and 3-methylamino-2-cyclohexen-1-one in acetic acid affords 5,6,7,8-tetrahydro-3-hydroxy - 5 - keto-9-methyl-4-carbazolecarboxylic acid.

EXAMPLE 9

Preparation of 5,6,7,8-tetrahydro-3-hydroxy-5-keto-7,7-dimethyl-9-phenyl-4-carbazolecarboxylic acid When the procedure of Example 1 is followed, a mixture of 2-trifluoromethyl-1,4-benzoquinone and 3-anilino-5,5-dimethyl-2-cyclohexen-1-one in acetic acid affords 5,6,7,8-tetrahydro-3-hydroxy - 5 - keto - 7,7 - dimethyl-9-phenyl-4-carbazolecarboxylic acid.

EXAMPLE 10

Preparation of 9-benzyl-5,6,7,8-tetrahydro-3-hydroxy-5-keto-4-carbazolecarboxylic acid When the procedure of Example 1 is followed, a mixture of 2-trifluoromethyl-1,4-benzoquinone and 3-benzyl-amino-2-cyclohexen-1-one in acetic acid affords 9-benzyl-5,6,7,8-tetrahydro - 3 - hydroxy - 5 - keto-4-carbazolecarboxylic acid.

EXAMPLE 11

Preparation of ethyl 5,6,7,8-tetrahydro-3-hydroxy-5-keto-4-carbazolecarboxylate

A stream of hydrogen chloride is introduced into a suspension of 5,6,7,8-tetrahydro - 3 - hydroxy-5-keto-4-carbazolecarboxylic acid in ethanol for 10 minutes. When the procedure of Example 3 is followed, ethyl 5,6,7,8-tetrahydro-3-hydroxy-5-keto-4-carbazolecarboxylate results.

What is claimed is:
1. A tetrahydrocarbazole of the formula:

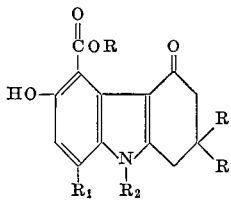

wherein R is a member selected from the group consisting of hydrogen and lower alkyl, $R_1$ is a member selected from the group consisting of hydrogen and chlorine and $R_2$ is a member selected from the group consisting of hydrogen, lower alkyl, phenyl and phenyl-lower alkyl.

2. The tetrahydrocarbazole according to claim 1: 5,6,7,8-tetrahydro - 3 - hydroxy - 7,7 - dimethyl-5-keto-4-carbazolecarboxylic acid.

3. The tetrahydrocarbazole according to claim 1: 5,6,7,8-tetrahydro - 3 - hydroxy-5-keto-4-carbazolecarboxylic acid.

4. The tetrahydrocarbozole according to claim 1: methyl 5,6,7,8-tetrahydro - 3 - hydroxy - 7,7 - dimethyl-5-keto-4-carbazolecarboxylate.

5. The tetrahydrocarbazole according to claim 1: ethyl 5,6,7,8-tetrahydro-3-hydroxy - 5 - keto - 4 - carbazolecarboxylate.

6. The tetrahydrocarbazole according to claim 1: methyl 5,6,7,8-tetrahydro-3-hydroxy - 7,7 - diethyl-5-keto-4-carbazolecarboxylate.

References Cited
UNITED STATES PATENTS 1,999,341  4/1935  Muth _____ 260—315

HENRY R. JILES, Primary Examiner

S. D. WINTERS, Assistant Examiner

US. Cl. X.R.

260—590, 563R, 468R; 424—274

UNITED STATES PATENT OFFICE
CERTIFICATE OF CORRECTION

Patent No. 3,579,534          Dated  May 18, 1971

Inventor(s) Ruddy Littell and George Rodger Allen, Jr.

It is certified that error appears in the above-identified patent and that said Letters Patent are hereby corrected as shown below:

In the FLOWSHEET, please change Fromula II from

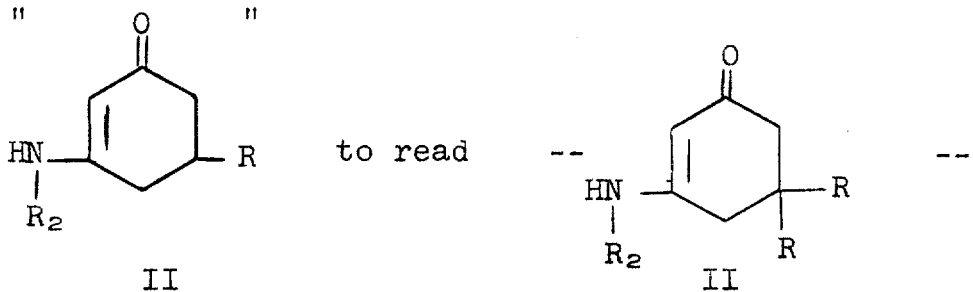

Also, please change Fromula III from

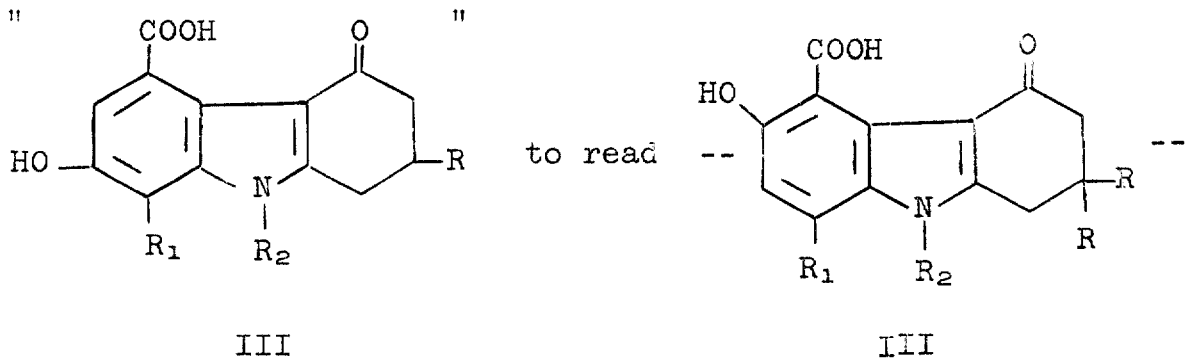

Signed and sealed this 21st day of September 1971.

(SEAL)
Attest:

EDWARD M. FLETCHER, JR.          ROBERT GOTTSCHALK
Attesting Officer                Acting Commissioner of Patents